United States Patent
Case et al.

(10) Patent No.: US 7,177,547 B1
(45) Date of Patent: *Feb. 13, 2007

(54) SYSTEM AND METHOD FOR CONTROLLING POLARITY OF A DATA SIGNAL

(75) Inventors: Dan Case, Gilroy, CA (US); Andreas Weber, Los Altos, CA (US); Giorgio Giaretta, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 738 days.

This patent is subject to a terminal disclaimer.

(21) Appl. No.: 10/282,579

(22) Filed: Oct. 29, 2002

Related U.S. Application Data

(60) Provisional application No. 60/400,548, filed on Aug. 2, 2002.

(51) Int. Cl.
*H04B 10/00* (2006.01)
(52) U.S. Cl. .............. 398/135; 398/136; 398/138; 398/140
(58) Field of Classification Search ........... 398/135, 398/136, 138, 139, 140, 152, 182, 184, 192
See application file for complete search history.

(56) References Cited

U.S. PATENT DOCUMENTS

| | | | |
|---|---|---|---|
| 4,916,705 A | 4/1990 | Glance | |
| 5,019,769 A | 5/1991 | Levinson | |
| 5,383,208 A | 1/1995 | Queniat et al. | |
| 5,442,321 A | 8/1995 | Bayruns et al. | 330/282 |
| 5,479,288 A | 12/1995 | Ishizuka et al. | |
| 5,502,785 A | 3/1996 | Wang et al. | |
| 5,537,093 A | 7/1996 | Aunon et al. | |
| 5,734,300 A | 3/1998 | Yoder | 330/308 |
| 5,861,908 A | 1/1999 | Tonosaki et al. | 348/57 |
| 5,878,015 A | 3/1999 | Schell et al. | |
| 5,933,264 A | 8/1999 | Van Der Heijden | |
| 5,956,168 A | 9/1999 | Levinson et al. | |
| 6,130,562 A | 10/2000 | Bosch et al. | |
| 6,333,804 B1 | 12/2001 | Nishiyama et al. | 359/189 |
| 6,400,857 B1 | 6/2002 | Hatami-Hanza et al. | |
| 6,414,974 B1 | 7/2002 | Russell et al. | |
| 2002/0071164 A1 | 6/2002 | Lauge et al. | |
| 2002/0149821 A1* | 10/2002 | Aronson et al. | 359/152 |
| 2002/0154354 A1* | 10/2002 | Raj et al. | 359/124 |

* cited by examiner

*Primary Examiner*—M. R. Sedighian
(74) *Attorney, Agent, or Firm*—Workman Nydegger

(57) ABSTRACT

An integrated post-amplifier and laser driver assembly is provided that is implemented as a single integrated circuit and is configured to implement various effects, such as polarity control, concerning data signals received by an optical transceiver in conjunction with which the integrated post-amplifier and laser driver assembly is employed. The data signal polarity control is implemented, both in the post-amplifier assembly and the laser driver assembly, by an amplifier that changes the polarity of the data signal by modifying a relationship between first and second propagation paths of the data signal. The data signal polarity control is typically performed in response to a multiplexed digital control signal received at a digital control interface of the integrated post-amplifier and laser driver assembly.

40 Claims, 5 Drawing Sheets

SYSTEM AND METHOD FOR CONTROLLING POLARITY OF A DATA SIGNAL

RELATED APPLICATIONS

This application claims the benefit of U.S. Provisional Patent Application Ser. No. 60/400,548, entitled "System and Method for Adjusting Polarity of a Data Signal", filed Aug. 2, 2002.

BACKGROUND OF THE INVENTION

1. Field of the Invention

The present invention relates generally to high speed data transmission systems. More particularly, embodiments of the present invention relate to systems and methods that serve to maintain the integrity of one or more data signals by checking and adjusting the polarity of the data signals as required to compensate for undesirable data signal effects that may result from various internal or external conditions.

2. Related Technology

Many high speed data transmission networks rely on optical transceivers and similar devices for facilitating transmission and reception of digital data embodied in the form of optical signals. Typically, data transmission in such networks is implemented by way of an optical transmitter, such as a laser, while data reception is generally implemented by way of an optical receiver, an example of which is a photodiode.

Various other components are also employed by the optical transceiver to aid in the control of the optical transmit and receive components, as well as the processing of various data and other signals. For example, such optical transceivers typically include a driver configured to control the operation of the optical transmitter in response to various control inputs. The optical transceiver also generally includes a post-amplifier configured to perform various operations with respect to certain parameters of a data signal received by the optical receiver.

In conventional optical transceivers, the driver and post-amplifier are implemented by way of separate integrated circuits ("IC") that are placed on a printed circuit board ("PCB") and electrically connected with each other and with the optical transmitter and receiver. One drawback to such an approach however, is that the two separate ICs take up a relatively large amount of space on the PCB, often necessitating the use of a two-sided PCB. This type of approach is problematic however, at least because such two-sided PCBs are generally more expensive and more difficult to manufacture than a single-sided PCB.

Another concern with conventional optical transceivers relates to the control circuit interface typically employed. Generally, the control circuit serves to direct both the processing of various data signals, as well as certain operational aspects of the optical transmitter and receiver. In conventional optical transceivers, the driver and post-amplifier communicate with the control circuit by way of corresponding analog interfaces. One problem with such an arrangement is that the need for multiple interfaces necessarily requires additional PCB space and complicates the manufacturing process.

As suggested by the foregoing, the implementation of post-amplifier and driver functionality in the form of discrete components gives rise to some redundancy in terms of the various components that are required. In addition to necessitating, for example, multiple interfaces, such arrangements also typically require respective sets of registers and monitoring circuits for the post-amplifier and for the laser driver. As in the case of the interfaces, these additional components take up additional space on the PCB and increase manufacturing costs and complexity.

With more particular reference to the analog interfaces between the control circuit and the post-amplifier and laser driver, it was suggested earlier that implementation of such analog interfaces requires the control circuit to communicate with the optical transceivers by way of analog signals. However, the use of such analog signals, at least where such use is required by the employment of analog interfaces, may limit the functionality of the control circuit and/or the optical transceiver.

Yet another concern with conventional optical transceivers relates to the polarity of the data signal that is received by the post-amplifier, and the polarity of the data signal that is transmitted by the laser driver. Note that with respect to data signals at least, "polarity" does not refer to a positive or negative charge, but rather refers to a data value relative to, for example, a desired value. For example, if a logical "1" is transmitted where a logical "0" should have been transmitted, such data may be referred to as inversely or improperly polarized.

With particular reference now to certain exemplary data transmission methods and systems, many data transmission lines include two data paths. Because the signaling on such transmission lines is differential, a decision must be made as to how to interpret a logical "1" or "0," in view of the fact that two data paths are involved. This implementation contrasts with use of a single data transmission line wherein an electrical or optical pulse corresponds, for example, to a "1" and no pulse corresponds to a "0." Typically, interpretation of a logical "1" or "0" in the context of differential data paths is implemented by defining a particular relationship between the two data paths as signifying either a "1" or a "0" and then interpreting the received signal accordingly.

By way of example, it could be decided that if the first data path has a positive electrical polarity relative to the second data path, then a logical "0" is represented. As another example, it could be decided that if a predetermined voltage differential exists between the first and second data paths, a logical "1" is represented. In any event, once a particular convention is selected, it is important that the relationship between the data paths be maintained so that the appropriate significance can be assigned to the detected differential between the two paths. However, problems sometimes occur that may compromise this relationship, and thus the error rate, among other things, of the transmitted data.

For example, as the data, in the form of a predetermined relationship such as those described above, is received, processed and/or transmitted by various system components, the data may become inverted so that a transmitted "1" becomes a "0" at some point in the system. As suggested above, such inversion may take the form, for example, of a reversed electrical polarity between the data paths. Data inversion may result, for example, from operations performed by of one or more of the system components, and/or from effects imposed by various conditions occurring within the operating environment of the system. In any case, such data inversion is problematic. For example, the inversion of all the "1"s in a data stream to "0"s would result in a one hundred percent error rate, an undesirable result.

In yet other cases, data inversion may result from the physical arrangement of the system circuitry. By way of example, if the data paths are somehow reversed during construction of the PCB, and such reversal is not identified and compensated for in some manner, data inversion will likely result.

In view of the foregoing, it would be useful to be able to integrate the driver and post-amplifier in such a way that their respective functionalities could be implemented in a single-sided PCB, while at the same time minimizing redundant components and functionality. Moreover, the integrated driver and post-amplifier should include, or be configured to interface with, a single digital control interface that will serve to enhance the flexibility and functionality of the optical transceiver, and related devices, by providing the ability to receive and process multiple digital control signals. Additionally, the integrated driver and post-amplifier should implement suitable digital-to-analog converters ("DAC") which will allow conversion of digital control signals to an analog form that that can be used in the processing of various data signals, as well as in the control of certain operational aspects of components such as the optical transmitter and receiver. Finally, the integrated driver and post-amplifier should implement data signal polarity control functionality so as to reduce and/or eliminate data error rates of the system wherein the integrated driver and post-amplifier is employed.

BRIEF SUMMARY OF AN EXEMPLARY EMBODIMENT OF THE INVENTION

In general, embodiments of the invention are concerned with high speed data transmission systems and methods that serve to maintain the integrity of one or more data signals by controlling the polarity of the data signals as required to compensate for undesirable data signal effects.

In one exemplary embodiment of the invention, an integrated post-amplifier and laser driver assembly ("PA/LD") suitable for use in a high speed communications system is provided that is configured to interface with an optical receiver and optical transmitter. The PA/LD is configured as a single IC and includes a digital control interface for communication with an external digital IC controller. The digital control interface, in turn, is arranged for communication with various registers and associated logic of the PA/LD that generally serve to implement the parsing and storage of instructions received from the digital IC controller.

The registers communicate with various circuits, at least some of which are exemplarily embodied as amplifiers, within the PA/LD by way of one or more DACs so that when it is desired to implement, by way of one or more of the circuits, various actions pertaining to instructions received from the digital IC controller, such instructions can be retrieved and converted to an analog form suitable to facilitate implementation of various actions by the appropriate circuits. In this exemplary embodiment, such actions relate to the processing of a data signal received from the optical receiver, and to the control of data transmission by way of an optical transmitter.

Finally, this exemplary embodiment of the PA/LD also includes a power supply circuit. In general, the power supply circuit is configured to control the flow of power to the optical transmitter in accordance with various predefined criteria.

With reference first to the operation of the laser driver of the PA/LD, certain user-specified parameter values and/or various instructions are transmitted from the digital IC controller to the laser driver by way of the serial digital interface. Such values and instructions may include, for example, a desired polarity of the data signal to be transmitted to the optical transmitter. These values and instructions are then stored in various registers within the PA/LD.

At such time as one or more of the values, such as the polarity of the data signal to be transmitted to the optical transmitter, is desired to be employed, the signal representing that value is converted to analog form by a corresponding DAC and routed to the appropriate circuit of the laser driver. In this embodiment, the amplifier generates, and transmits to the optical transmitter, a modified data signal having the desired polarity.

The operation of the post-amplifier of the PA/LD is similar in many regards. In particular, certain values and instructions relating to the processing of a data signal received by the post-amplifier from an optical receiver are received from the digital IC controller by way of the serial digital interface and stored in the corresponding registers of the integrated post-amplifier and laser driver assembly. In this embodiment, such values and instructions may include, for example, a desired polarity for the data signal received from the optical receiver. In this exemplary case, the amplifier changes the polarity of the incoming signal to match a given value. This change is implemented without any feedback, or in "open loop" manner. The amplifier then generates and transmits a modified data signal having the desired polarity.

These and other, aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various aspects of exemplary embodiments of the invention.

It is to be understood that the drawings are diagrammatic and schematic representations of such exemplary embodiments, and are not limiting of the present invention, nor are they necessarily drawn to scale.

A. Aspects of Exemplary PA/LD Implementations

It should be noted that while some embodiments of the invention are well-suited for use in conjunction with a high speed data transmission system conforming to the Gigabit Ethernet ("GigE") physical specification, such operating environment is exemplary only and embodiments of the invention may, more generally, be employed in any of a variety of high speed data transmission systems, some of which may have line rates up to, or exceeding, 2.5 Gbit. For example, some embodiments of the invention are compatible with the Fibre Channel ("FC") physical specification.

Further, embodiments of the invention may be implemented in various ways. By way of example, some embodiments of the PA/LD are implemented in Small Form Factor Pluggable ("SFP") bi-directional transceiver modules. As suggested above, such transceiver modules are configured for GigE and/or FC compliance. Exemplarily, such transceiver modules are capable of transmitting and/or receiving at a wavelength of about 850 nm. Moreover, these transceiver modules can operate over a wide range of temperatures. For example, some of such transceiver modules are effective over a temperature range of about 80° C., such as from about −10° C. to about +70° C. Of course, such embodiments and associated operating parameters are exemplary only, and are not intended to limit the scope of the invention in any way.

B. Aspects of Exemplary PA/LD Architecture

Figure 1:
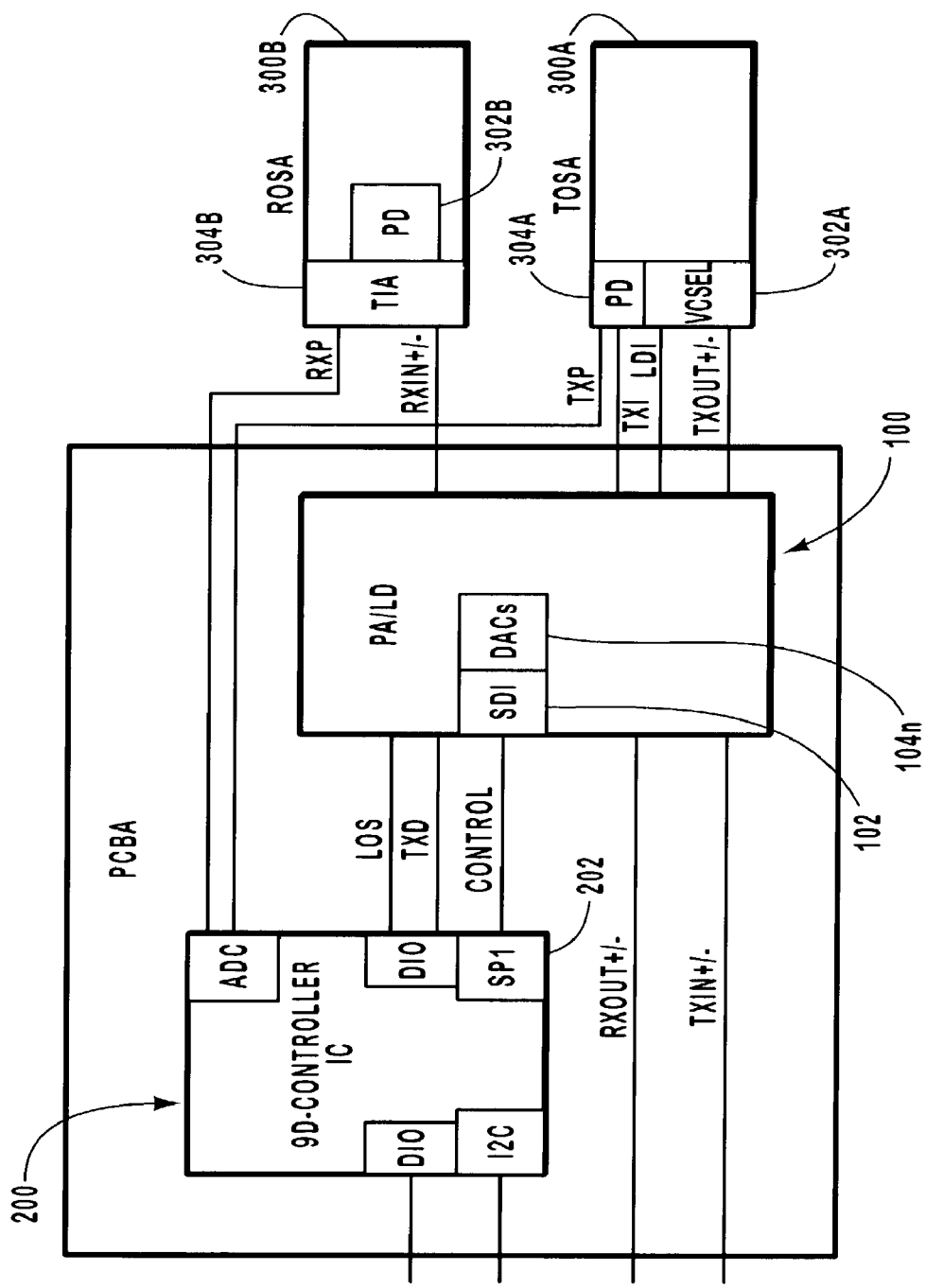
FIG. 1 is a block diagram that illustrates various aspects of an exemplary operating environment for embodiments of the present invention.

With reference first to FIG. 1, details are provided concerning various aspects of the general architecture of an exemplary embodiment of an integrated post-amplifier and laser driver ("PA/LD") assembly 100. Generally, the PA/LD 100 is configured for communication with a digital IC controller 200, as well as with a 'transmit' optical subassembly ("TOSA") 300A and a 'receive' optical subassembly ("ROSA") 300B.

Among other things, the PA/LD 100 comprises a digital control interface 102 connected with glue logic module 103 that, in turn, is configured for communication with one or more digital-to-analog converters ("DAC") 104n. Exemplarily, the digital control interface comprises a serial digital interface. Embodiments of a digital control interface are disclosed and claimed in U.S. patent application Ser. No. 10/282,669 presently designated as Workman, Nydegger & Seeley entitled DIGITAL CONTROL INTERFACE TO POST-AMPLIFER AND LASER DRIVER, filed the same day herewith, and incorporated herein in its entirety by this reference.

One useful aspect of such a digital control interface is that it enables the use of multiple control parameters that can be readily multiplexed into one, or a relatively small number of, digital control signals. Thus, the digital control interface permits a relative increase in the number of PA/LD 100 operations that can be controlled, without necessitating a corresponding increase in components or circuitry and, by virtue of the use of digital control signals, the digital control interface also contributes to a relative decrease in the number of the control signals that are required to control PA/LD 100 operations.

With respect to the foregoing, an internal serial bus arrangement may alternatively be employed to implement some or all of the functionality disclosed herein. Embodiments of such a serial bus arrangement are disclosed and claimed in U.S. patent application Ser. No. 10/266,870 presently designated as Pennie & Edmonds entitled OPTICAL TRANSCEIVER MODULE WITH MULTIPURPOSE INTERNAL SERIAL BUS, filed Oct. 8, 2002, and incorporated herein in its entirety by this reference.

It should be noted here that the PA/LD 100 may be referred to herein as comprising a 'post-amplifier' or 'post-amplifier assembly,' and a 'laser driver' or 'laser driver assembly,' exemplary embodiments of which may comprise one or more amplifiers or other control devices intended to implement certain effects with respect to signals transmitted and/or received by the PA/LD 100. In yet other instances, no distinction between the post-amplifier and laser driver is made, and the PA/LD 100 may simply be referred to as comprising various control, and other, devices intended to implement certain effects with respect to signals transmitted and/or received by the PA/LD 100.

In general however, the devices and/or systems that are concerned with implementation of functionality that relates primarily to a data signal received by the PA/LD 100 are typically referred to as a 'post amplifier' or 'post amplifier assembly.' On the other hand, devices and/or systems that are concerned with implementation of functionality that relates primarily to control, by the PA/LD 100, of the transmission of a data signal are typically referred to as a 'laser driver' or 'laser driver assembly.' Nonetheless, a device or system that comprises a portion of the 'post amplifier' in one embodiment, may comprise a portion of the 'laser driver' in another embodiment. Accordingly, the foregoing distinctions are not intended to, nor should be construed to, limit the scope of the invention in any way.

In general, the functionality of the integrated post-amplifier and laser driver assembly 100 is typically implemented as a single IC on a single-sided PCB. In some instances, the PA/LD is implemented as a non-hermetic plastic packaged IC with lead frame. However, other types of IC packages, such as ceramic packages, may alternatively be employed, consistent with the requirements of a particular application or operating environment.

One useful aspect of the single IC configuration is that it minimizes the number of external devices that are required, as some or all of the external devices can be incorporated within the IC. By way of example, at least some embodiments of the invention obviate the need for external passive devices that perform functions such as, but not limited to, set point, matching, filter, and A/C coupling. A related aspect of the single IC configuration is that it generally eliminates the need for connectors, such as flex connectors, between the post-amplifier and laser driver. Further, the single IC package can be incorporated into a relatively small size, as small as 4 mm×4 mm in some cases.

In the illustrated embodiment, the TOSA 300A exemplarily comprises a vertical cavity surface emitting laser ("VCSEL") 302A in communication with a photodiode 304A. In at least some embodiments, the VCSEL comprises a non-hermetic lead frame plastic package. One aspect of VCSELs that makes them desirable in at least some applications is their relatively low cost. Of course, other types of optical transmitters may also be employed. In general, any light transmission source, and transmission wavelength, that is compatible with PA/LD 100 may be used.

Similarly, ROSA 300B exemplarily comprises a PIN photodiode 302B in communication with a transimpedance amplifier ("TIA") 304B and, in this embodiment at least, requires no capacitors for its operation. Moreover, in at least some embodiments, the ROSA is implemented as a non-hermetic lead frame plastic package. As in the case of the TOSA 300A however, other embodiments of ROSA 300B may alternatively be employed.

In some embodiments, one or both of the TOSA 300A and ROSA 300B further include systems and/or devices to aid in evaluation and diagnostic evolutions concerning their performance and/or the performance of related components and systems. By way of example, the TOSA 300A and/or ROSA 300B in such embodiments includes a log amplifier for use in conjunction with a monitor photodiode, such as PIN photodiode 302B or photodiode 304A, and/or current mirror circuitry.

Another aspect of some embodiments of the TOSA 300A is that they provide for a DC active bias for laser modulation. This eliminates the need for bias T modulation devices and circuitry such as are typically employed in laser modulation applications.

With continuing reference now to aspects of the exemplary PA/LD illustrated in C FIG. 1, exemplary embodiments of the PA/LD 100 are configured to transmit, receive, and/or process a variety of different signals. Such signals may comprise, among other things, data and monitoring signals, control signals, or may be concerned with the transmission of power to/from various components. In this exemplary embodiment, the data signals are digital and include those signals designated RXIN+/− and RXOUT+/− and which denote, respectively, a data signal received from ROSA 300B, and a data signal transmitted by the PA/LD 100 to a customer. Similarly, the signals designated TXIN+/− and TXOUT+/− denote, respectively, a data signal received by the PA/LD 100 from a customer, and a customer data signal transmitted to TOSA 300A. In any case, the +/− designation refers to the fact that, in at least some embodiments, the signal channel consists of two data transmission lines of opposite polarities. Thus, in this exemplary implementation, the signal designated TXIN+/− actually comprises a first line TXIN+ and a second line TXIN−.

Note that, as suggested by the foregoing, the RXIN+/− and RXOUT+/− typically do not comprise discrete signals. Rather, the RXOUT+/− signal simply comprises a version of the RXIN+/− signal that has been modified, such as by way of changes to parameters such as its polarity, rise time, or amplitude, for example. The same is likewise true with respect to the TXIN+/− signal and the TXOUT+/− signal.

With continuing reference now to FIG. 1, PA/LD 100 is also configured to receive, via the digital control interface 102, various control signals pertaining to the operation of the TOSA 300A and/or to the processing of the RXIN+/− data signal received by PA/LD 100 from ROSA 300B. Such control signals can be tailored according to any of a variety of variables. For example, the temperature of VCSEL 302A may be used as a basis for modifications or adjustments to a control signal relating, for example, to a bias point for a C circuit element of PA/LD 100. Examples of such control signals are considered in further detail below.

Yet another exemplary control signal transmitted from the digital IC controller 200 to the PA/LD 100 is the TXD signal. In general, the TXD signal directs the PA/LD 100 to shut down the TOSA 300A. Shutdown of the TOSA 300A may be implemented, for example, when it is desired to power down a module to facilitate performance of diagnostics, or when there is a fault indication such as an internal short or excessive transmit power. As indicated in FIG. 1, the TXD signal may, in at least some cases, be transmitted from the digital IC controller 200 to the PA/LD 100 other than by way of the respective digital control interfaces of those components. Note that the same is likewise true with respect to the LOS signal for example, as discussed below.

In addition to the various control signals generated and transmitted to the PA/LD 100 by the digital IC controller 200, signals generated by one of the optical devices may likewise be used to aid in the control of those devices and/or for other purposes. By way of example, in the embodiment of PA/LD 100 illustrated in FIGS. 1 and 2, the TOSA 300A generates the TXI signal and transmits the TXI signal to the PA/LD 100. In general, the TXI signal received at the PAILD 100 from the TOSA 300A indicates the level of current at which the TOSA 300A is operating. In this exemplary embodiment, the TXI signal serves as an input to a power supply circuit of the PAILD 100 that is used to control the input voltage to the VCSEL 302A (FIG. 1), as discussed in further detail below.

Note that in some cases, the TXI signal may be used for purposes other than implementing a control functionality. By way of example, some exemplary embodiments use the TXI signal to implement a monitoring functionality with respect to the VCSEL 302A current. Details concerning one such exemplary embodiment are provided below in conjunction with the discussion of the TXP signal.

As suggested earlier, embodiments of the PA/LD 100 are also configured to transmit, receive, and/or process a variety of monitoring signals pertaining to the operation and/or status of various components. One example of a monitoring functionality implemented by way of the PA/LD 100 is indicated by the LOS signal. Generally, the LOS signal is generated and transmitted by the PA/LD 100 to the digital IC controller 200 when the incoming data signal RXIN+/− has been lost, or otherwise fails to comport with certain established criteria.

Other exemplary monitoring functionalities related to, but not necessarily implemented by this exemplary embodiment of, the PA/LD 100, include the TXP signal transmitted from the TOSA 300A to the digital IC controller 200 indicating the optical power of the TOSA 300A. More particularly, the TXP is an electrical signal that is proportional to the optical power in the VCSEL 302A. A similar monitoring signal is generated with respect to the operation of the ROSA 300B. In particular, the RXP signal transmitted from the ROSA 300B to the digital IC controller 200 indicates the optical power of the ROSA 300B. Exemplarily, the RXP signal comprises an electrical signal that is proportional to the optical power in the ROSA 300B photodiode 302B.

Some of the monitoring signals, such as the TXP signal for example, may be used for purposes other than implementing a monitoring functionality. By way of example, some exemplary embodiments use the TXP signal as an input to a power supply circuit that is used to control the power input to the TOSA 300A.

In connection with the foregoing discussion of exemplary aspects of the TXP and TXI signals, it should be noted that the functionality of the TXP and TXI signals and, more generally, other signals disclosed herein, may be interchanged in some cases if necessary to suit the requirements of a particular application.

Figure 2:
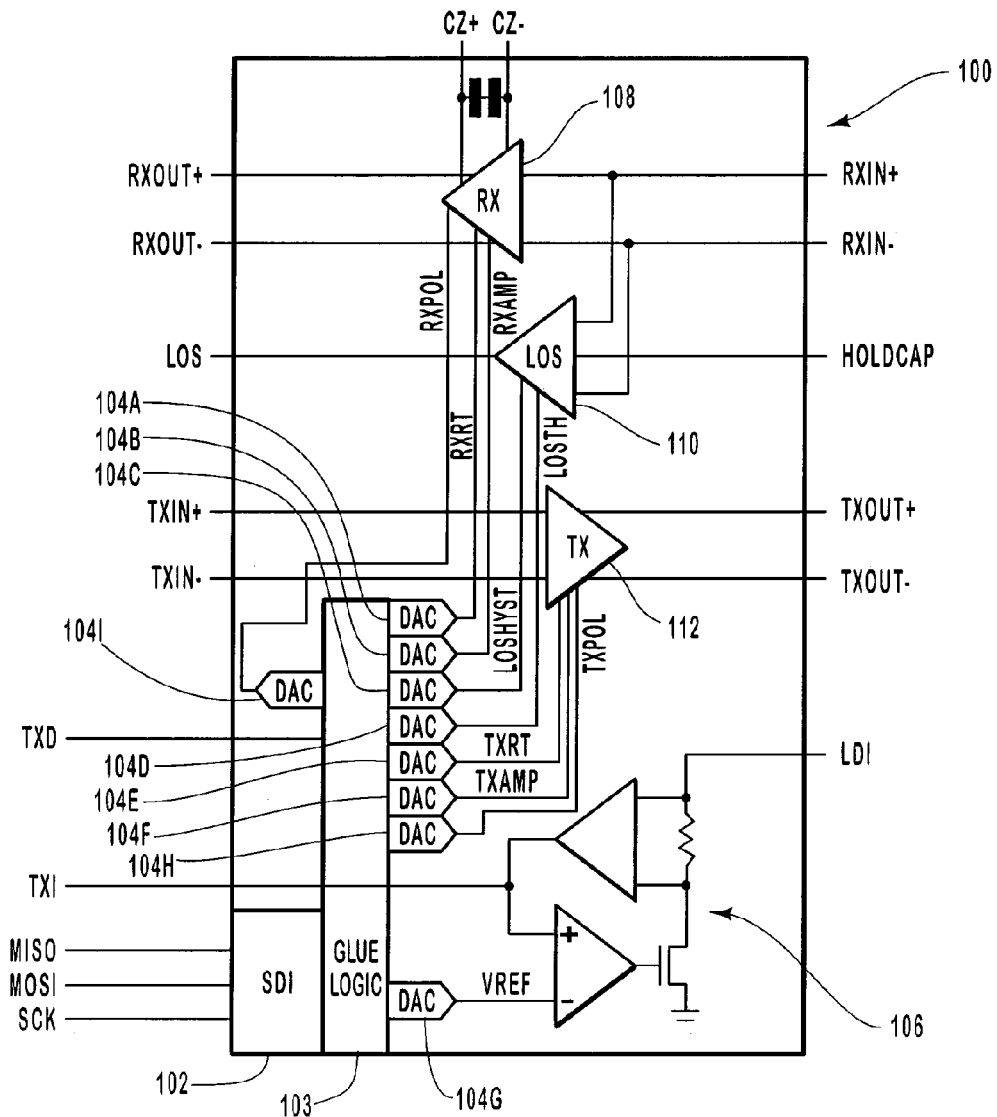
FIG. 2 is a schematic diagram that illustrates aspects of an exemplary embodiment of an integrated PA/LD that includes a digital control interface.

As noted earlier, the implementation of the PA/LD 100 illustrated in FIGS. 1 and 2 is configured so that the TXP signal provides a monitoring functionality with respect to TOSA 300A performance, and the TXI signal serves as the input to a power supply circuit that controls the power to the TOSA 300A. Alternatively however, other implementations of the PA/LD 100 may be configured so that the TXI signal provides the monitoring functionality with respect to TOSA 300A performance, while the TXP signal serves as the input to the power supply circuit that controls the power to the TOSA 300A. In either case, the monitoring signal may be provided to internal and/or external users. In yet other implementations of the PA/LD 100, the signal that provides the monitoring functionality may be omitted altogether. Thus, the foregoing are exemplary implementations and are not intended to limit the scope of the invention in any way.

In addition to the signals that implement various monitoring and control functionalities, yet other signals employed in conjunction with the PA/LD 100 concern aspects of PA/LD 100 operations such as power transmission and control. By way of example, the LDI signal is the actual DC bias current that is applied to the TOSA 300A to power the VCSEL 302A. As another example, the reference voltage signal VREF is an input to a feedback system that controls the input voltage to the VCSEL.

Of course, the enumeration and combinations of the various data, monitoring, power, control, and other, signals disclosed herein are exemplary only and are not intended to limit the scope of the invention. Accordingly, other exemplary embodiments of PA/LD 100 may include, implement or embody additional or alternative functionalities, as necessary to suit the requirements of a particular system or application.

Directing attention now to FIG. 2, further details are provided concerning various aspects of the architecture of an exemplary embodiment of the PA/LD 100. As indicated there, the digital control interface 102 of this embodiment of the PA/LD 100 exemplarily comprises a three pin configuration adapted to receive master-in-slave-out ("MISO") and master-out-slave-in ("MOSI") control signals at 'data' and 'enable' pins, respectively, as well as a system clock ("SCK") signal, from the digital IC controller 200. While two and three pin serial interfaces are particularly useful in some embodiments of the invention, the serial interface may, more generally, be implemented as any industry standard, or customized, serial interface.

The digital control interface 102 communicates, in turn, with a plurality of DACs 104A through 104I by way of glue logic module 103. In the illustrated embodiment, nine DACs are provided, although the number may vary depending upon the requirements of a particular application or system. As discussed below, the DACs generally operate to convert a digital control signal into an analog signal that can be acted upon by the PA/LD 100. In this exemplary embodiment, some of the DACs comprise 8 bit DACs, but various other types of DACs may alternatively be employed.

As indicated in FIG. 2, the DACs in this exemplary embodiment are concerned with, respectively, the following signals: DAC 104A—RXRT (control transition time of RXIN+/−); DAC 104B—RXAMP (control amplitude of RXIN+/−); DAC 104C—LOSHYST (loss of signal hysteresis for RXIN+); DAC 104D—LOSTH (loss of signal threshold for RXIN−); DAC 104E—TXRT (control transition time of TXOUT+/−); DAC 104F—TXAMP (control amplitude of TXOUT+/−). In addition to the foregoing, a DAC 104G is provided that communicates with a power supply circuit 106 to control power input LDI to TOSA 300A by way of a reference voltage signal VREF. Further, DAC 104H and DAC 104I are provided that are generally concerned with, respectively, controlling the polarity of TXOUT+/− and RXOUT+/−.

With continuing reference to FIG. 2, various amplifiers, which exemplarily comprise radio frequency ("RF") amplifiers, are provided that communicate with respective DACs and generally act to implement certain actions specified by the control signal received by the PA/LD 100 from the digital IC controller 200. For example, the illustrated embodiment of PA/LD 100 includes an RX amplifier 108 that receives analog input from DACs 104A, 104B and 104I and modifies RXIN+/−, in accordance with such inputs, to produce RXOUT+/−. In the illustrated embodiment, RX amplifier 108 is configured to modify the transition time, amplitude and polarity of RXIN+/−.

Further, the RX amplifier 108 is exemplarily configured with CZ+/− ports for use in bypassing a feedback network, such as may be used to bias the RX amplifier 108. In this exemplary arrangement, a large, external capacitor is placed between the CZ+/− ports. In other embodiments however, such biasing is achieved without the need for the external capacitor, and hence the CZ+/− ports.

Additionally, an LOS circuit 110, exemplarily embodied as an amplifier, is provided that monitors RXIN+/− and transmits an LOS signal to the digital IC controller 200 when RXIN+/− exceeds, or falls below, a predefined threshold. Also, the LOS circuit 110 implements a hysteresis functionality to minimize or eliminate random switching of the LOS signal, usually caused by small variations in received signal strength or noise and often referred to as 'chatter,' that would likely otherwise result as RXIN+/− moves back and forth over the predefined threshold.

The illustrated embodiment of the PA/LD 100 further includes a TX amplifier 112 that receives analog input from DACs 104E, 104F and 104H and modifies TXIN+/−, in accordance with such inputs, to produce TXOUT+/−. In the illustrated embodiment, the TX amplifier 112 is configured to modify the transition time, amplitude and polarity of TXIN+/−. In at some embodiments, the TX amplifier 112 may be implemented as a plurality of amplifiers, each of which is concerned with the control of one of the transition time, amplitude and polarity of the TXIN+/− signal. In yet other embodiments, the TX amplifier 112 may be implemented as a single multi-stage amplifier so that all of the aforementioned control functionalities concerning the TXIN+/− signal are implemented by a single component. Note that the foregoing discussion is equally germane to the RX amplifier 108.

While the aforementioned exemplary embodiments are concerned with, among other things, control of data signal polarity, it may be useful in some instances to be able to control the polarity of other signals as well. By way of example, some embodiments additionally, or alternatively, provide for the control of the polarity of the LOS and TXD signals. As suggested by the foregoing example then, embodiments of the invention should not be construed to be limited to polarity control as applied to data signals.

Finally, it should be noted that signal polarity control may also be implemented with respect to analog data or other signals, as controlled by analog control signals. In exemplary implementations of this type, a digital control interface is not required, and a suitable analog control interface may be employed instead.

Figure 3:
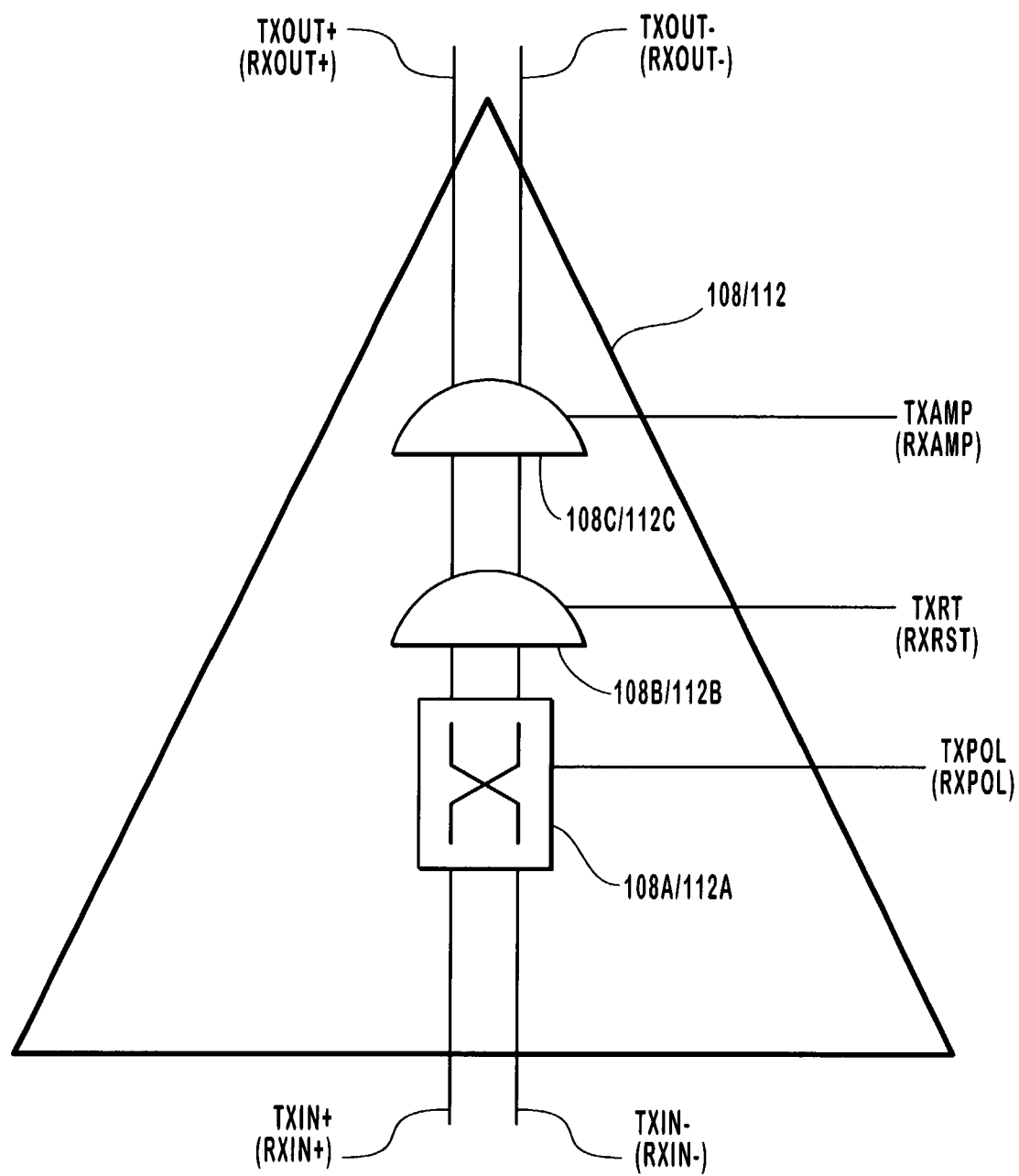
FIG. 3 is a schematic diagram that illustrates aspects of an exemplary embodiment of an amplifier such as may be employed to facilitate control of data signal polarity.

Directing attention now to FIG. 3, further details are provided concerning a control device, exemplarily embodied as RX amplifier 108 and TX amplifier 112, for controlling the polarity of a data signal. As suggested in FIG. 3, the same general configuration may be employed for RX amplifier 108 and TX amplifier 112. However, the components used to implement such configurations may vary depending on whether the RX amplifier 108 or the TX amplifier 112 is implemented. For example, in the case of the RX amplifier 108, a relatively larger number of gain stages may be employed since a relatively larger gain may be required. In the case of the TX amplifier 112 on the other hand, relatively large high-current transistors may be employed as necessary for the TX amplifier 112 to drive the required current to the load.

Exemplarily, the TX amplifier 108 includes a polarity inverter 108A, as well as two output stages 108B and 108C. Similarly, RX amplifier 112 includes a polarity inverter 112A and two output stages 112B and 112C. At least some embodiments of the TX amplifier 108, as well as the RX amplifier 112, further include an input stage (not shown) as well and may include additional output stages. The foregoing amplifier configurations are exemplary only however. In this regard, it was noted earlier herein that some embodiments of the invention may use multiple single-stage amplifiers instead of the multi-stage amplifier illustrated in FIG. 3. In general then, any amplifier or control device configuration useful in implementing the functionality disclosed herein may be employed.

The illustrated embodiments of TX amplifier 108 and RX amplifier 112 are each configured with three control inputs, though various other control inputs and combinations thereof may be employed. As discussed earlier, the TX amplifier 108 is configured to receive the TXPOL signal at the polarity inverter 108A, and to receive the TXRT and TXAMP signals at the 108B output stage and 108C output stage, respectively. Similarly, the RX amplifier 112 is configured to receive the RXPOL signal at the polarity inverter 112A, and to receive the RXRST and RXAMP signals at the 112B output stage and 112C output stage, respectively.

As discussed in greater detail below, the TX amplifier 108 uses the TXPOL, TXRT and TXAMP signals to generate an output signal TXOUT+/− having desired characteristics. Likewise, the RX amplifier 112 uses the RXPOL, RXRST and RXAMP signals to generated an output signal RXOUT+/− having desired characteristics.

It should be noted here that the various types and combinations of amplifiers, as well as their respective functionalities, disclosed herein are exemplary only. Various other types of control systems and devices may alternatively employed. In connection with the foregoing, the combinations of functionalities implemented by way of PA/LD 100 are, likewise, exemplary only and are not intended to limit the scope of the invention in any way. Accordingly, additional or alternative functionalities, and combinations thereof, may also be implemented by PA/LD 100, as necessitated by the requirements of a particular system or application.

C. General Aspects of PA/LD Operations

Figure 4:
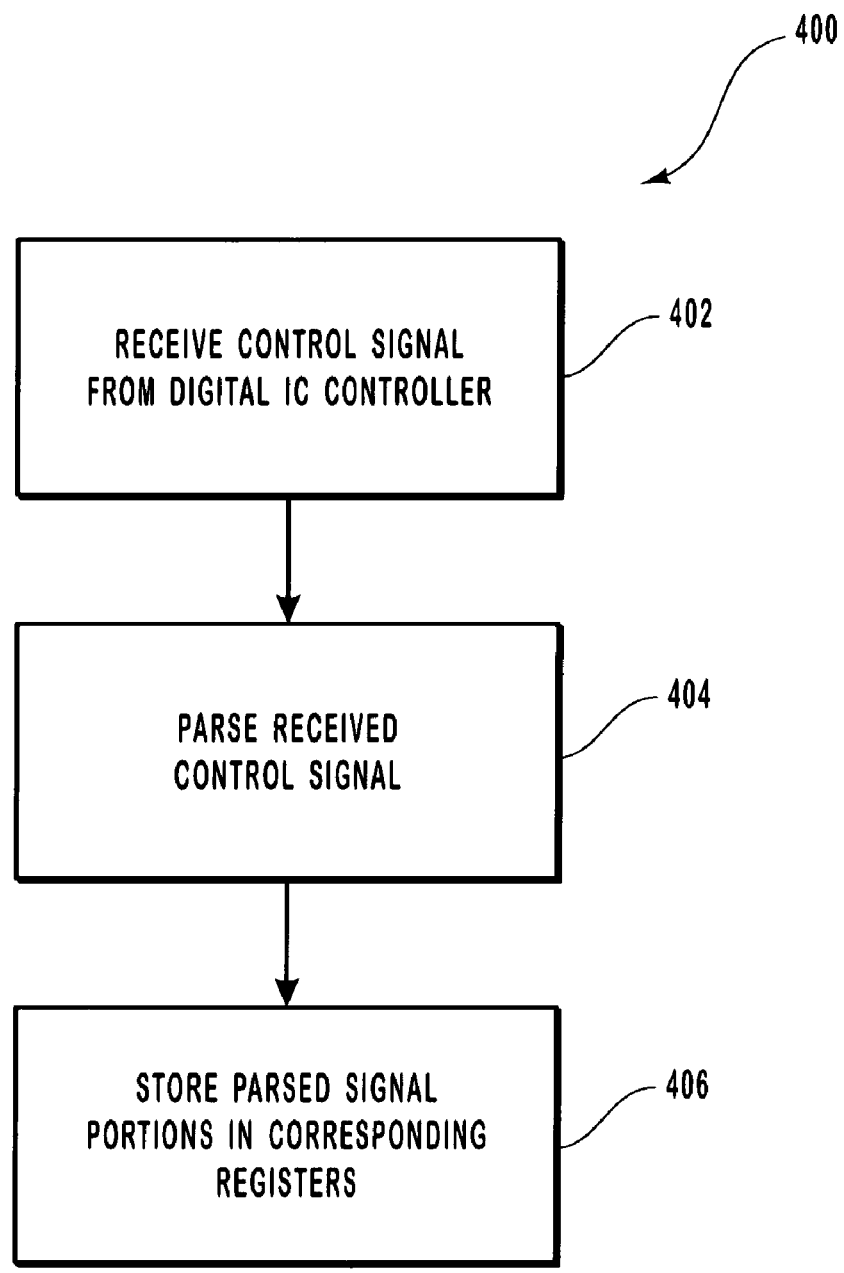
FIG. 4 is a flow diagram indicating aspects of an exemplary method for the processing of an incoming multiplexed digital control signal, such as may be produced by a digital IC controller.
Figure 5:
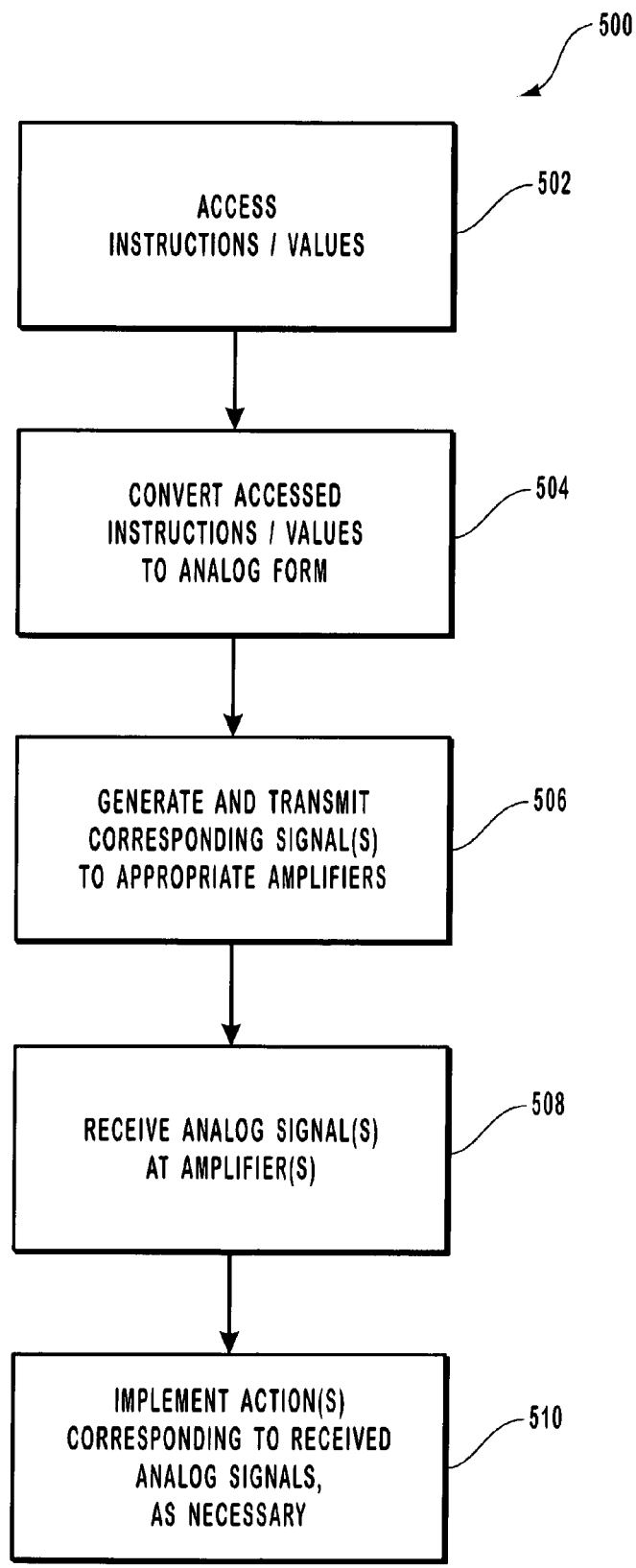
FIG. 5 is a flow diagram indicating general aspects of an exemplary method for using control signals and/or other signals to cause one or more control devices of the integrated PA/LD to perform various operations concerning a data signal received or transmitted by the integrated PA/LD.

With continuing attention to FIGS. 1 through 3, and directing attention now to FIGS. 4 through 5, details are provided now concerning certain operational aspects of the illustrated embodiment of PA/LD 100 and various related components. With attention first to FIG. 4, aspects of an exemplary method 400 for receiving and processing an incoming control signal are illustrated.

In particular, at state 402, the control signal initially transmitted from the digital IC controller 200 is received at the PA/LD 100. Exemplarily, such signals relate to, among other things, the processing of TXIN+/− and RXIN+/−, the operation of TOSA 300A, and the disablement of PA/LD 100. Some of the control signals transmitted by the digital IC controller 200 may be received at the digital control interface 102 of PA/LD 100, while other control signals transmitted by the digital IC controller 200, such as the TXD signal, are received directly at the 'glue logic' module 103. This arrangement is exemplary only however, and various alternative schemes for receipt of incoming control signals at the PA/LD 100 may be implemented.

In general, the control signals transmitted by the digital IC controller 200 and received at the PA/LD 100 comprise one or more digital words, comprised of a defined sequence of digital bits, which may constitute instructions and/or parameter values. When the control signal has been received at PA/LD 100, state 404 is entered wherein the glue logic module 103 parses the control signal and directs the digital words, or portions thereof, into the various discrete instructions and/or parameter values.

After parsing has been completed, state 406 is entered. At this state, the glue logic module 103 directs the parsed segments of the data signal to the appropriate registers within the glue logic module. Because each register corresponds with a particular DAC, the parsed segments of the data signal can thus be stored in a manner consistent with the way in which the particular segment is to be employed. By way of example, a parsed segment of the control signal that concerns the threshold for the LOS signal is stored in a DAC that is configured to communicate with the LOS circuit 110.

At such time as the incoming control signal has been parsed and registered, the PA/LD 100 then performs various actions based upon the parsed instructions and/or values. Thus, control information concerning a wide variety of PA/LD 100 operations can be transmitted by way of a single control signal. Moreover, the control signal requires only a single digital interface at the PA/LD 100. This arrangement considerably simplifies the physical implementation of the PA/LD 100, as well as the processing of the incoming control signal.

Directing attention now to FIG. 5, details are provided concerning aspects of an exemplary process 500 for implementing actions based upon one or more control signals. As discussed below, FIG. 5 depicts only certain general aspects of such an exemplary process, and reference to more particular implementations is made after aspects of the process illustrated in FIG. 5 have been addressed.

In general, state 502 is entered wherein the glue logic module 103 accesses and retrieves the instructions and/or values stored in the various registers. Next, state 504 is entered wherein the applicable DACs convert the accessed instructions and/or values from digital to analog form. After this conversion has been completed, state 506 is entered and the applicable DACs generate and transmit corresponding analog signals to the appropriate amplifiers. In state 508, the appropriate amplifiers receive the analog signals and then move to state 510 where various actions are implemented with regard to the signals with which such amplifiers are concerned.

D. Aspects of Exemplary PA/LD Operations—TX Amplifier & TOSA

With more particular reference now to the input customer data signal TXIN+/− (FIG. 2), DACs 104E, 104F and 104H, respectively, convert the words, or portions thereof, relating to the TXIN+/− transition time, TXIN+/− amplitude and TXIN+/− polarity, to an analog form and then transmit the analog signals TXRT, TXAMP and TXPOL, as/if applicable, to TX amplifier 112.

In response, the TX amplifier 112 then adjusts the transition time, amplitude and/or polarity of TXIN+/− consistent with the TXRT, TXAMP and TXPOL signals, respectively, as necessary to convert signal TXIN+/− into a signal TXOUT+/− that is suitable for driving the VCSEL 302A. The TXOUT+/− signal is then transmitted by the PA/LD 100 to VCSEL 302A of TOSA 300A. Of course, this operational scenario concerning the use of the combination of the TXRT, TXAMP and TXPOL signals is exemplary only and various other parameters of TXIN+/−, and combinations thereof, may be monitored and/or controlled as well.

With continuing attention to FIGS. 1 and 2, details are provided concerning exemplary operational aspects of the TOSA 300A. In the illustrated embodiment, the TOSA 300A receives the TXOUT+/− signal and the VCSEL 302A then transmits an optical signal (not shown) consistent with the received TXOUT+/−. In this way, the performance of VCSEL 302A can be adjusted and controlled in response to variables such as, but not limited to, temperature and voltage, so as to achieve transmission of an optical signal having certain desired properties or characteristics.

At substantially the same time as the VCSEL 302A transmits the optical signal, the photodiode 304A receives at least a portion of the optical signal transmitted by VCSEL 302A. Finally, the photodiode 304A generates and transmits the TXP signal to the digital IC controller 200, thereby indicating the optical power of the TOSA 300A. In this exemplary implementation, the TXP signal primarily serves to facilitate a monitoring functionality with respect to TOSA 300A performance. In addition to the TXP signal, the photodiode 304A also generates and transmits the TXI signal. As discussed in further detail below, the TXI signal is employed, in this exemplary embodiment, to facilitate control of TOSA 300A operations by way of power supply circuit 106.

In general, the power supply circuit 106 uses the TXI signal, in conjunction with the VREF signal, to vary, as necessary, the input current to the VCSEL 302A. As discussed earlier, the TXI is generated by the TOSA 300A and indicates the level of current at which the TOSA 300A is operating. On the other hand, the VREF signal represents a desired VCSEL 302A bias point. Typically, the value of the VREF signal, expressed as a signal reference voltage, is specified by digital IC controller 200 and transmitted to the PA/LD 100 as part of a control signal. The glue logic module 103 cooperates with DAC 104G to cause the generation and transmission of the VREF signal to the power supply circuit 106.

Thus, in the event that the feedback voltage from the TOSA 300A, indicated by or derived from the TXI signal, does not match the VREF signal reference voltage, then the power supply circuit 106 adjusts the LDI input to the TOSA 300A until a match is achieved. Thus, the power supply circuit 106 uses the feedback provided in the form of the TXI signal, in conjunction with the predetermined reference voltage provided in the form of the VREF signal, to determine and adjust, if necessary, the input power LDI to the VCSEL 302A and, thus, the optical power of the TOSA 300A. As noted earlier, the TXP signal may be C employed in place of the TXI signal to provide similar control functionality with respect to TOSA 300A.

As an alternative to controlling various aspects of the TOSA 300A operations, it may C be desirable in some instances to suspend the operation of TOSA 300A. To that end, the TXD signal is generated and transmitted by digital IC controller 200 to PA/LD 100 upon the satisfaction of certain conditions, and/or the occurrence of certain events, relating to the system. For example, the TXD signal would be generated and transmitted in the event of the occurrence of a predefined fault condition. In cases where the TXD signal has been generated and transmitted, the PA/LD 100 responds to the TXD signal by terminating transmission of the LDI signal to TOSA 300A, and thus data transmission by TOSA 300A, upon receipt of the TXD signal. Data transmission is then recommenced upon receipt, by the PA/LD 100, of an appropriate signal by way of the 'enable' pin of the digital control interface 102.

E. Aspects of Exemplary PA/LD Operations—RX and LOS Amplifiers & ROSA

It should be noted here that certain general aspects of an exemplary process 500 for using control devices such as amplifiers to implement actions concerning various optical devices, based upon one or more control signals received from a digital IC controller or other source, have already been discussed above in connection with FIG. 5. Accordingly, the following discussion will focus primarily on certain exemplary implementations of process 500 as they relate to the operation of the RX amplifier 108, the LOS circuit 110 and/or the ROSA 300B.

With respect first to the ROSA 300B, it was noted earlier that ROSA 300B converts an optical input signal, received at photodiode 302B, into the electrical signal RXIN+/− which is then received by the PA/LD 100. In general, the PA/LD 100 controls various aspects of the RXIN+/− signal, in accordance with a control signal received from the digital IC controller 200. The modified RXIN+/− signal is then transmitted by the PA/LD 100 to the customer as the RXOUT+/− signal.

Aspects of an exemplary process for performing various operations concerning the RXIN+/− signal generated by the ROSA 300B will now be considered in further detail. In particular, DACs 104A, 104B and 104I, respectively, convert the words, or portions thereof, of the control signal relating to the RXIN+/− transition time, RXIN+/− amplitude and RXIN+/− polarity, to an analog form and then transmit the analog signals RXRT, RXAMP and/or RXPOL, to RX amplifier 108. The RX amplifier 108 then adjusts, if necessary, the transition time, amplitude and/or polarity of RXIN+/− consistent with the received RXRT, RXAMP and/or RXPOL signals, respectively. The modified RXIN+/−, denoted as output signal RXOUT+/−, is then transmitted by the PA/LD 100 to the customer. It should be noted that the foregoing operational scenario concerning processes relating to the RXIN+/− signal is exemplary only and various other parameters of RXIN+/− may be monitored and/or controlled as well.

In addition to the RXIN+/− signal discussed above, ROSA 300B also generates the RXP signal which provides feedback to digital IC controller 200 concerning the optical power of photodiode 302B. In general, signals concerning ROSA 300B performance, and/or the performance of TOSA 300A, such as the RXP, TXP and TXI signals, may be generated and transmitted substantially continuously, or on any other desired basis.

In addition to controlling various parameters of RXIN+/−, some embodiments of PA/LD 100 are also configured to monitor, and report on, aspects of the status of RXIN+/−. In one exemplary embodiment, DACs 104C and 104D convert the hysteresis and threshold data, received from digital IC controller 200 as words or portions thereof, to an analog form and then transmit, respectively, the LOSHYST and LOSTH signals to the LOS circuit 110. The LOS circuit 110 then monitors RXIN+/− and transmits the LOS signal to the digital IC controller 200 when RXIN+/− exceeds, or falls below, a predefined threshold, and/or when no data is detected in the RXIN+/− signal.

Finally, the LOS circuit 110 also implements a hysteresis functionality to minimize or eliminate chatter on the LOS signal that may otherwise result as RXIN+/− moves back and forth over the predefined threshold. In particular, in the event that RXIN+/− moves below the predefined threshold, it must drop substantially below that threshold before the LOS signal will be generated and transmitted. The same is likewise true in the case where RXIN+/− moves above the predefined threshold. The upper and/or lower thresholds may be defined as necessary to suit the requirements of a particular application. In some embodiments of the invention, such loss of signal functionality may also be implemented with respect to the customer signal RXIN+/−.

F. Aspects of Exemplary Signal Polarity Control Process— RX and TX Amplifiers

As noted earlier, the functionality implemented by the RX amplifier 108 and the TX amplifier 112 includes, among other things, controlling the polarity of the output data signals RXOUT+/− and TXOUT+/−, respectively.

Accordingly, one aspect of the data signal polarity control functionality provided by embodiments of the invention is that it allows for a relatively higher degree of flexibility in terms of the layout and implementation of the components that comprise the PA/LD 100 and related systems. In particular, because the polarity of data signals received at the PA/LD 100 can be readily modified, prior to further transmission, in response to a control signal, it is of little consequence that a data signal entering the PA/LD is improperly polarized, since the polarity can be corrected before the PA/LD 100 transmits the data signal on to the next user.

Moreover, the use of a digital control interface also enhances the ease with which data signal polarity control can be implemented. In particular, the digital control interface is adapted for use with data, representing multiple control parameters, that have been multiplexed into one, or a few, control signals. Thus, signal polarity control can be implemented easily and without compromising the number and type of other control parameters that can be multiplexed into the control signal.

Control of such output data signal polarity may be accomplished in various ways. Some exemplary implementations are addressed below, however, other processes and methods may alternatively be employed.

With reference to use of the TXPOL signal for example, the polarity of the output data signal TXOUT+/− is changed by electronically crossing-over the TXIN+ and TXIN− propagation paths, which causes the TXOUT+ signal to propagate along the path along which the TXOUT− signal would otherwise have propagated, and vice-versa. The foregoing polarization adjustment scheme is likewise germane to data signal polarity adjustments made by the RX amplifier 108 to RXOUT+/− in response to the RXPOL signal.

In another case, the signal inversion can be accomplished by reprogramming a positive gain block to be a negative gain block, or vice versa. As another example, the data path can be programmed to pass through either a positive gain block or through a negative gain block. More generally however, any device and/or process, or combination thereof, that is effective in modifying and/or maintaining, as applicable, the relationship between the data paths so that the appropriate significance can be assigned to the detected differential between the two paths, may be employed.

As suggested by the foregoing, a variety of means may be employed to perform the functions disclosed herein, of an amplifier or other control device. Thus, the embodiments of the amplifiers disclosed herein are but exemplary structural implementations of a means for controlling signal polarity and, as such, those exemplary implementations should not be construed as limiting the scope of the present invention in any way. Rather, any other structure or combination of structures effective in implementing the functionality disclosed herein may likewise be employed.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. An integrated post-amplifier and laser driver assembly for use in conjunction with an optical receiver and an optical transmitter, comprising:
    a post-amplifier assembly configured for communication with the optical receiver;
    a laser driver assembly implemented together with the post-amplifier in a single IC and including a means for controlling signal polarity, and the laser driver assembly being configured for communication with the optical transmitter; and
    a digital control interface in at least indirect communication with the post-amplifier assembly and the laser driver assembly, wherein the means for controlling signal polarity implements a process comprising:
        receiving a signal that includes first and second propagation paths;
        determining whether or not a polarity of the signal conforms with a predetermined criterion;
        modifying the signal, if required, by adjusting the polarity of the signal so as to produce a modified signal having a polarity that conforms with the predetermined criterion; and
        transmitting the modified signal.

2. The integrated post-amplifier and laser driver assembly as recited in claim 1, wherein the means for controlling signal polarity adjusts the polarity of the signal by modifying a relationship between the first and second propagation paths of the signal.

3. The integrated post-amplifier and laser driver assembly as recited in claim 1, wherein the means for controlling signal polarity adjusts the polarity of the signal by electronically crossing the first and second propagation paths of the signal.

4. The integrated post-amplifier and laser driver assembly as recited in claim 1, wherein the means for controlling signal polarity adjusts the polarity of the signal by changing an existing voltage differential between the first and second propagation paths of the signal.

5. The integrated post-amplifier and laser driver assembly as recited in claim 1, wherein the means for controlling signal polarity adjusts the polarity of the signal by changing the electrical polarity of the first and second propagation paths, relative to each other.

6. The integrated post-amplifier and laser driver assembly as recited in claim 1, wherein the means for controlling signal polarity further modifies the signal by performing, if required, at least one of the following:
    adjusting the amplitude of the signal; and
    adjusting the rise time of the signal.

7. The integrated post-amplifier and laser driver assembly as recited in claim 1, wherein at least one of the determining and modifying processes is performed in response to a digital control signal.

8. The integrated post-amplifier and laser driver assembly as recited in claim 1, wherein the means for controlling signal polarity comprises an amplifier that includes a signal polarity control stage.

9. The integrated post-amplifier and laser driver assembly as recited in claim 1, wherein the digital control interface comprises a serial digital interface.

10. The integrated post-amplifier and laser driver assembly as recited in claim 1, further comprising:
   a glue logic module in communication with the digital control interface;
   a first digital to analog converter in communication with the glue logic module and the post-amplifier assembly; and
   a second digital to analog converter in communication with the glue logic module and the laser driver assembly.

11. The integrated post-amplifier and laser driver assembly as recited in claim 1, wherein the post-amplifier assembly includes means for controlling signal polarity.

12. The integrated post-amplifier and laser driver assembly as recited in claim 11, wherein the post-amplifier assembly means for controlling signal polarity comprises an amplifier having a signal polarity control stage.

13. In a high-speed data communications system that includes an optical receiver and an optical transmitter, an integrated post-amplifier and laser driver assembly, comprising:
   a post-amplifier assembly configured for communication with the optical receiver;
   a laser driver assembly implemented together with the post-amplifier in a single IC and including an amplifier having a signal polarity control stage, the laser driver being configured for communication with the optical transmitter by way of the amplifier;
   a digital control interface in at least indirect communication with the post-amplifier assembly and the laser driver assembly;
   a glue logic module in communication with the digital control interface;
   a first digital to analog converter in communication with the glue logic module and the post-amplifier assembly; and
   a second digital to analog converter in communication with the glue logic module and the laser driver assembly.

14. The integrated post-amplifier and laser driver assembly as recited in claim 13, wherein the amplifier of the laser driver assembly further comprises at least one of: a signal amplitude control stage; and a signal rise time control stage.

15. The integrated post-amplifier and laser driver assembly as recited in claim 13, wherein the post-amplifier assembly includes an amplifier having a signal polarity control stage.

16. The integrated post-amplifier and laser driver assembly as recited in claim 15, wherein the amplifier of the post-amplifier assembly further comprises at least one of: a signal amplitude control stage; and a signal rise time control stage.

17. The integrated post-amplifier and laser driver assembly as recited in claim 13, further comprising a loss-of-signal circuit in at least indirect communication with the optical receiver and the digital control interface.

18. An optical transceiver, comprising:
   an optical transmitter;
   an optical receiver; and
   an integrated post-amplifier and laser driver assembly, comprising:
      a post-amplifier assembly in communication with the optical receiver;
      a laser driver assembly implemented together with the post-amplifier in a single IC and including a means for controlling signal polarity, and the laser driver assembly in communication with the optical transmitter; and
   a digital control interface in at least indirect communication with the post-amplifier assembly and the laser driver assembly, wherein the means for controlling signal polarity implements a process comprising:
      receiving a data signal that includes first and second propagation paths;
      determining whether or not a polarity of the signal conforms with a predetermined criterion;
      modifying the data signal, if required, by adjusting the polarity of the data signal so as to produce a modified data signal having a polarity that conforms with the predetermined criterion; and
      transmitting the modified data signal.

19. The optical transceiver as recited in claim 18, wherein the optical receiver comprises a 'receive' optical subassembly.

20. The optical transceiver as recited in claim 19, wherein the 'receive' optical subassembly comprises:
   a transimpedance amplifier; and
   a photodiode in communication with the transimpedance amplifier.

21. The optical transceiver as recited in claim 18, wherein the optical transmitter comprises a 'transmit' optical subassembly.

22. The optical transceiver as recited in claim 21, wherein the 'transmit' optical subassembly comprises:
   a laser; and
   a photodiode in communication with the laser.

23. The optical transceiver as recited in claim 22, wherein the laser comprises a VCSEL.

24. The optical transceiver as recited in claim 18, wherein the optical transceiver is compatible with at least one of: the Gigabit Ethernet protocol; and the Fibre Channel protocol.

25. The optical transceiver as recited in claim 18, wherein the means for controlling signal polarity adjusts the polarity of the data signal by modifying a relationship between the first and second propagation paths of the data signal.

26. The optical transceiver as recited in claim 18, wherein the means for controlling signal polarity adjusts the polarity of the data signal by electronically crossing the first and second propagation paths of the data signal.

27. The optical transceiver as recited in claim 18, wherein the means for controlling signal polarity adjusts the polarity of the data signal by changing an existing voltage differential between the first and second propagation paths of the data signal.

28. The optical transceiver as recited in claim 18, wherein the means for controlling signal polarity adjusts the polarity of the data signal by changing the electrical polarity of the first and second propagation paths, relative to each other.

29. The optical transceiver as recited in claim 18, wherein the means for controlling signal polarity further modifies the data signal by performing, if required, at least one of the following:
   adjusting the amplitude of the data signal; and
   adjusting the rise time of the data signal.

30. The optical transceiver as recited in claim 18, wherein at least one of the determining and modifying processes is performed in response to a digital control signal.

31. The optical transceiver as recited in claim 18, wherein the means for controlling signal polarity comprises an amplifier that includes a signal polarity control stage.

32. The optical transceiver as recited in claim 18, wherein the post-amplifier assembly includes an amplifier having a signal polarity control stage.

33. In a high speed data communications system, an optical transceiver, comprising:
   an optical transmitter;
   an optical receiver; and
   an integrated post-amplifier and laser driver assembly, comprising:
      a post-amplifier assembly in communication with the optical receiver and including an amplifier having a signal polarity control stage; and
      a laser driver assembly implemented together with the post-amplifier in a single IC and including an amplifier having a signal polarity control stage, the laser driver being in communication with the optical transmitter by way of the amplifier; and
      a serial digital interface in at least indirect communication with the post-amplifier assembly and the laser driver assembly;
      a glue logic module in communication with the digital control interface;
      a first digital to analog converter in communication with the glue logic module and the post-amplifier assembly; and
      a second digital to analog converter in communication with the glue logic module and the laser driver assembly.

34. The optical transceiver as recited in claim 33, wherein the optical receiver comprises a 'receive' optical subassembly that includes:
   a transimpedance amplifier; and
   a photodiode in communication with the transimpedance amplifier.

35. The optical transceiver as recited in claim 33, wherein the optical transmitter comprises a 'transmit' optical subassembly that includes:
   a laser; and
   a photodiode in communication with the laser.

36. The optical transceiver as recited in claim 33, wherein the optical transceiver is compatible with at least one of: the Gigabit Ethernet protocol; and the Fibre Channel protocol.

37. The optical transceiver as recited in claim 33, wherein the amplifier of the laser driver assembly further comprises at least one of: a signal amplitude control stage; and a signal rise time control stage.

38. The optical transceiver as recited in claim 33, wherein the amplifier of the post-amplifier assembly further comprises at least one of: a signal amplitude control stage; and a signal rise time control stage.

39. The optical transceiver as recited in claim 33, further comprising a loss-of-signal amplifier in at least indirect communication with the optical receiver and the digital control interface.

40. The optical transceiver as recited in claim 33, wherein the serial digital control interface is configured to receive a multiplexed digital control signal.

* * * * *

UNITED STATES PATENT AND TRADEMARK OFFICE
CERTIFICATE OF CORRECTION

PATENT NO.         : 7,177,547 B1                                                          Page 1 of 1
APPLICATION NO. : 10/282579
DATED              : February 13, 2007
INVENTOR(S)        : Case et al.

It is certified that error appears in the above-identified patent and that said Letters Patent is hereby corrected as shown below:

Column 9
Line 52, change "104B" to --104E--

Signed and Sealed this

Sixteenth Day of November, 2010

David J. Kappos
*Director of the United States Patent and Trademark Office*